(12) United States Patent
Fersht

(10) Patent No.: US 6,363,786 B1
(45) Date of Patent: Apr. 2, 2002

(54) DYNAMICALLY ENHANCED FIBER OPTIC PARTICLE MOTION ACCELEROMETER

(75) Inventor: Samuel N. Fersht, Studio City, CA (US)

(73) Assignee: Litton Systems, Inc., Woodland HIlls, CA (US)

( * ) Notice: Subject to any disclaimer, the term of this patent is extended or adjusted under 35 U.S.C. 154(b) by 0 days.

(21) Appl. No.: 09/627,688

(22) Filed: Jul. 28, 2000

(51) Int. Cl.[7] .......................... G01P 15/08; G01P 15/13
(52) U.S. Cl. .................................................. 73/514.26
(58) Field of Search ........................ 73/514.26, 514.27

(56) References Cited

U.S. PATENT DOCUMENTS

| | | | |
|---|---|---|---|
| 4,719,800 A | * | 1/1988 | Moser ...................... 73/514.26 |
| 4,932,258 A | | 6/1990 | Norling |
| 4,959,539 A | | 9/1990 | Hofler et al. |
| 5,134,882 A | * | 8/1992 | Taylor ...................... 73/514.26 |
| 5,287,332 A | | 2/1994 | Lea |
| 5,317,929 A | | 6/1994 | Brown et al. |
| 5,883,308 A | | 3/1999 | Fersht |
| 6,175,108 B1 | * | 1/2001 | Jones et al. ............ 250/227.14 |

* cited by examiner

Primary Examiner—Richard A. Moller
(74) Attorney, Agent, or Firm—Lynn & Lynn

(57) ABSTRACT

A fiber optic particle motion accelerometer has a housing with a mid-section mounted therein such that the mid-section flexes in response to acceleration along a sensing axis. A proof mass is mounted to an outer edge of the mid-section. A first spiral-wound optical fiber coil is mounted to a first side of the mid-section and a second spiral-wound optical fiber coil is mounted to a second side of the mid-section. A first hinge is formed in the mid-section adjacent the mounting of the mid-section in the housing, and a second hinge is formed in the mid-section between the proof mass and the first and second fiber optic coils. The optical fiber coils are included in an interferometer such that acceleration along the sensing axis produces a phase difference between optical signals propagating in the optical fiber coils.

8 Claims, 4 Drawing Sheets

DYNAMICALLY ENHANCED FIBER OPTIC PARTICLE MOTION ACCELEROMETER

BACKGROUND OF THE INVENTION

This invention relates generally to fiber optic accelerometers and particularly to a particle motion accelerometer in which a sensing member has a pair of optical fiber coils formed on opposite sides of a disk arranged to twist in response to acceleration along an axis perpendicular to the plane of the disk.

The common methodology of designing a fiber optic particle motion accelerometer is based on a configuration of a sensing element consisting of two washer shaped unbalanced fiber optic coils that are centrally hard bonded to a washer-like metal plate. The plate of this composite design is mounted in a housing, either around its center to a post or at its perimeter to the outer encasing. In either case the proof mass and the pickoff coils are generally in the same space. Addition of hard mounted weights to the proof mass of the accelerometer will enhance the output of the accelerometer at the cost of reducing its natural frequency. It is well-known that trying to gain output by reducing the sensing element's natural frequency to approach the band limit, would result in dependence of the accelerometer output on its fundamental mode damping constant, which is a highly volatile parameter. This design in a broadband application requires a large amount of costly fiber, that is formed using a fiber of lower diameter jacket for the same cladding.

SUMMARY OF THE INVENTION

The present invention provides an improved accelerometer design based on an understanding of how its different parts contribute to its broadband output characteristics.

A fiber optic particle motion accelerometer according to the present invention comprises a housing with a mid-section mounted within the housing such that the mid-section flexes in response to acceleration along a sensing axis. A proof mass is mounted to an outer edge of the mid-section. A first spiral-wound optical fiber coil is mounted to a first side of the mid-section and a second spiral-wound optical fiber coil is mounted to a second side of the mid-section. A first hinge is formed in the mid-section adjacent the mounting of the mid-section in the housing, and a second hinge is formed in the mid-section between the proof mass and the first and second fiber optic coils.

The fiber optic particle motion accelerometer according to the present invention may further comprise a pair of mounting posts connected to the housing with a central portion of the mid-section being secured between ends of the mounting posts. The first hinge may be defined by a reduced thickness portion of the mid-section between the mounting posts and the fiber optic coils. The second hinge may be defined by a reduced thickness portion of the mid-section, with the first and second hinges having unequal thicknesses.

The fiber optic particle motion accelerometer may also comprise a first spacer mounted between the first side of the mid-section and the first fiber optic coil and a second spacer mounted between the second side of the mid-section and the second fiber optic coil;

The housing may be formed generally as a cylinder having an inner peripheral slot therein with the mid-section having an outer edge portion retained within the inner peripheral slot to mount the mid-section to the housing. The mid-section may have a central passage therein with the proof mass being mounted to an inner edge portion of the mid-section.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
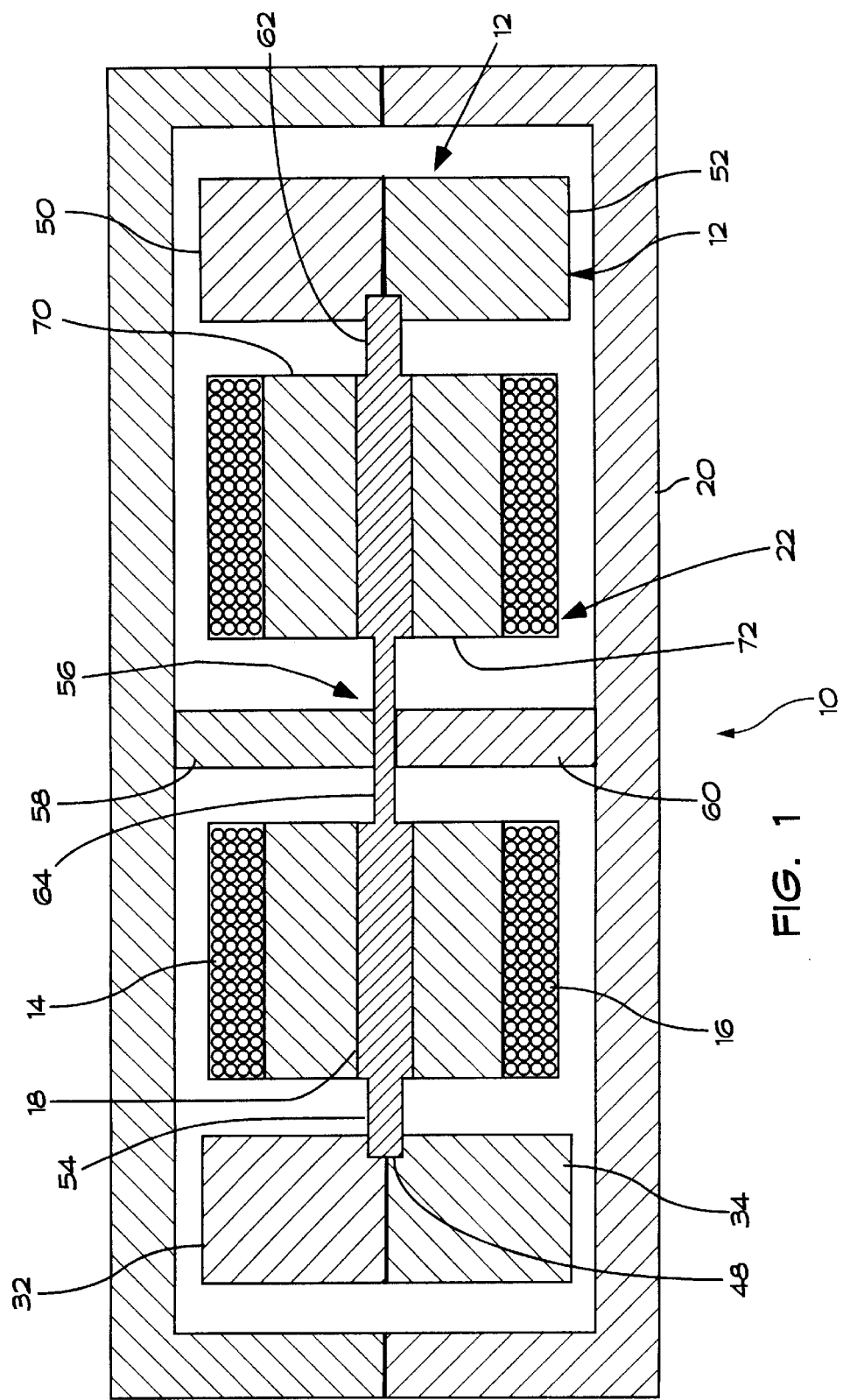
FIG. 1 is a cross sectional view of a first embodiment of a particle motion accelerometer according to the present invention in which a sensing element has a central support.

FIG. 1 illustrates a particle motion accelerometer 10 according to the present invention. Dynamically, the particle motion accelerometer 10 includes four major parts, namely: a main proof mass 12, a pair of spiral-wound optical fiber coils 14 and 16, a mid-section 18 carrying the coils 14 and 16 and a housing 20.

The spiral-wound optical fiber coils 14 and 16 are placed on opposite sides of the mid-section 18. Together the spiral-wound optical fiber coils 14 and 16 and the mid-section 18 comprise a sensing element 22. Acceleration of the housing 20 along a sensing axis perpendicular to the plane of the coils 14 and 16 twists the mid-section 18 so that the length of one of the coils 14 and 16 increases while the length of the other one decreases. These length changes cause a phase change between optical signals propagating in the coils 14 and 16.

Figure 2:
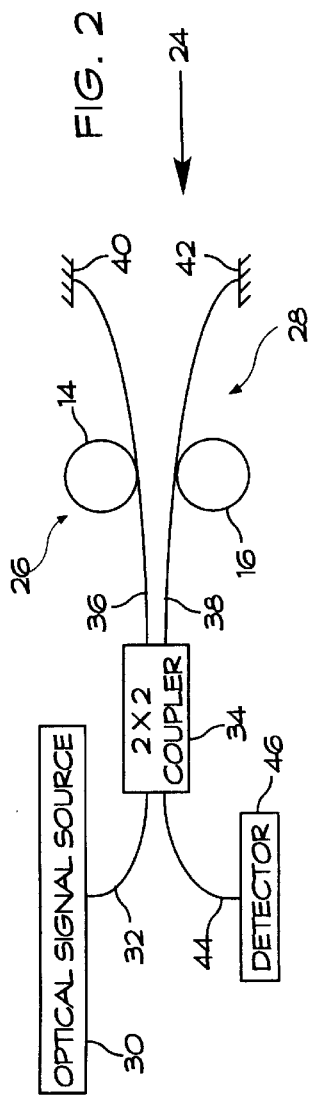
FIG. 2 illustrates an interferometer structure that may be included in the particle motion accelerometer according to the present invention.

The phase change may be detected by forming an interferometer 24 as shown in FIG. 2 to include the coil 14 in a first leg 26 of the interferometer 24 and the coil 16 in a second leg 28. The interferometer 24 includes an optical signal source 30 arranged to provide optical signals to an optical fiber lead 32 for delivery to an optical coupler 34. The optical coupler 34 divides the signals from the optical signal source 30 between a pair of optical fiber leads 36 and 38 arranged to guide the signals to the optical fiber coils 14 and 16, respectively. After traversing the coils 16 and 18, the optical signals reflect from mirrors 40 and 42, respectively, and make a second pass through the coils 14 and 16. While propagating through the coils 14 and 16, an acceleration-dependent phase shift occurs between optical signals guided by the legs 26 and 28. This phase shift produces an interference pattern when the signals from the coils 14 and 16 are combined in the coupler 34. An optical fiber lead 44 guides the combined optical signals to a photodetector 46, which produces electrical signals that may be processed to determine the acceleration of the sensing element 22 along the sensing axis.

Other interferometer structures (not shown) that may be used with the particle motion accelerometer 10 are well-known in the art.

The sensing element 22 has its greatest sensitivity when the mid-body 18 has the maximum amount of twisting in response to acceleration along the sensing axis. This particle motion accelerometer 10 according to the present invention provides greater sensitivity than prior art devices.

Referring again to FIG. 1, the mid-section 18 is formed generally as a disk that is secured in the housing 20. The proof mass 12 is a ring that is preferably mounted to the outer edge 48 of the mid-section 18. The proof mass 12 may be formed of a pair of upper and lower sections 50 and 52, respectively, that are placed on the outer edge 48 of the mid-section 18 and then bonded together. A portion 54 of the mid-section 18 near the outer edge 48 preferably has a thickness that is less than the thickness of the mid-section 18 in the region where the coils 14 and 16 are located. The coils 14 and 16 may be formed directly on the mid-section 18, or they may be formed separately and bonded thereto.

A central portion 56 of the mid-section 18 may also have a thickness that is less than the thickness of the mid-section 18 where the fiber coils 14 and 16 are located. The central portion 56 is clamped between a pair of support members 58 and 60. The support members 58 and 60 may be formed integrally with the housing 20, or they may be formed separately and attached to the housing. The reduced thickness portions 54 and 56 of the mid-section 18 form hinges 62 and 64, respectively, that allow the mid-section 18 to twist in response to acceleration along the sensing axis.

The particle motion accelerometer 10 may also include a pair of spacers 70 and 72 mounted on opposite sides of the mid-section 18 with the coils 14 and 16 being mounted on the spacers 70 and 72, respectively. The spacers 70 and 72 are preferably formed as hollow cylinders. The spacers 70 and 72 add mass to the mid-section 18, which increases the amount of twist in response to acceleration. The spacers 70 and 72 may be formed integrally with the mid-section 18, or they may be separate components that are bonded to the upper and lower surfaces of the mid-section 18.

In general, it is advisable to minimize interaction between the sensing element 22 and the housing 20, in terms of the proof-mass fundamental mode natural frequency and accelerometer output.

Figure 3:
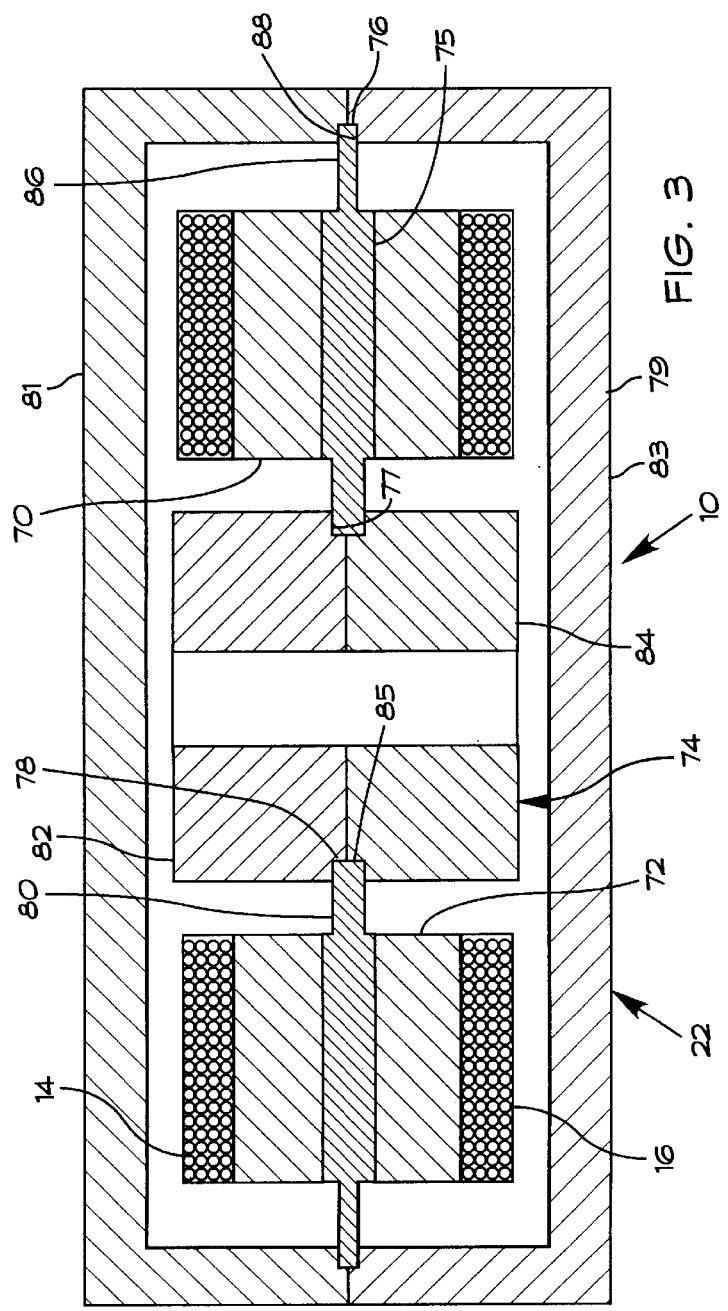
FIG. 3 is a cross sectional view of a second embodiment of a particle motion accelerometer according to the present invention in which a sensing element is supported at its outer edges.

The outer rim 48 of the mid-section 18 is the convenient space for mounting the proof-mass ring 12. However, in the interest of saving space for the fiber coils 14 and 16, an embodiment of the invention may be formed having a proof mass 74 located at the center of a mid-section 75 as shown in FIG. 3 with an outer rim 76 being supported by a housing 79. In the embodiment of FIG. 3, the proof mass 74 is formed of a pair of upper and lower rings 82 and 84 mounted in a central hole 85 in the mid-section 75. An inner edge 78 of the mid-section 75 is retained within a slot 77 defined by the edges of the upper and lower rings 82 and 84, respectively. The housing 79 is formed of upper and lower housing sections 81 and 83, respectively. The outer rim 76 of the mid section 75 is retained in a slot 88 created by joining the upper and lower housing sections 81 and 83

Referring again to FIG. 1, the connection of the mid-section 18, on the inner side to a post comprising the support members 58 and 60 and on the outside edge 48 to the proof mass 12, should be via thin annular plates of unequal thickness, thus securing the most twist of the mid-section 18. Accordingly, as shown in FIG. 1, the central portion 56 of the mid-section 18 has a thickness that is less than the thickness of the outer portion 54.

In the embodiment shown in FIG. 3, the connection of the mid-section 75 to the inner proof mass 74 and the outer connection to the housing 79 should be via thin annular plates of unequal thickness. Therefore, as shown in FIG. 3, the portion 86 of the mid-section 75 adjacent the outer rim 76 has a thickness less than the thickness of the portion 80 adjacent the inner rim.

The optical fiber discs 14 and 16 are hard-bonded at the far ends of the mid-section 75 for maximum output. Within the space envelope available, the mass should be maximized; correspondingly, the height of the mid-section 75 should reach its space limit, to enhance output while maintaining a desired natural frequency. The optical fiber in the coils 14 and 16 should be wound from the inside to the smallest possible diameter, since on the average the light phase contribution of a fiber turn is independent of its diameter, thus economizing in fiber length and cost.

Figure 4:
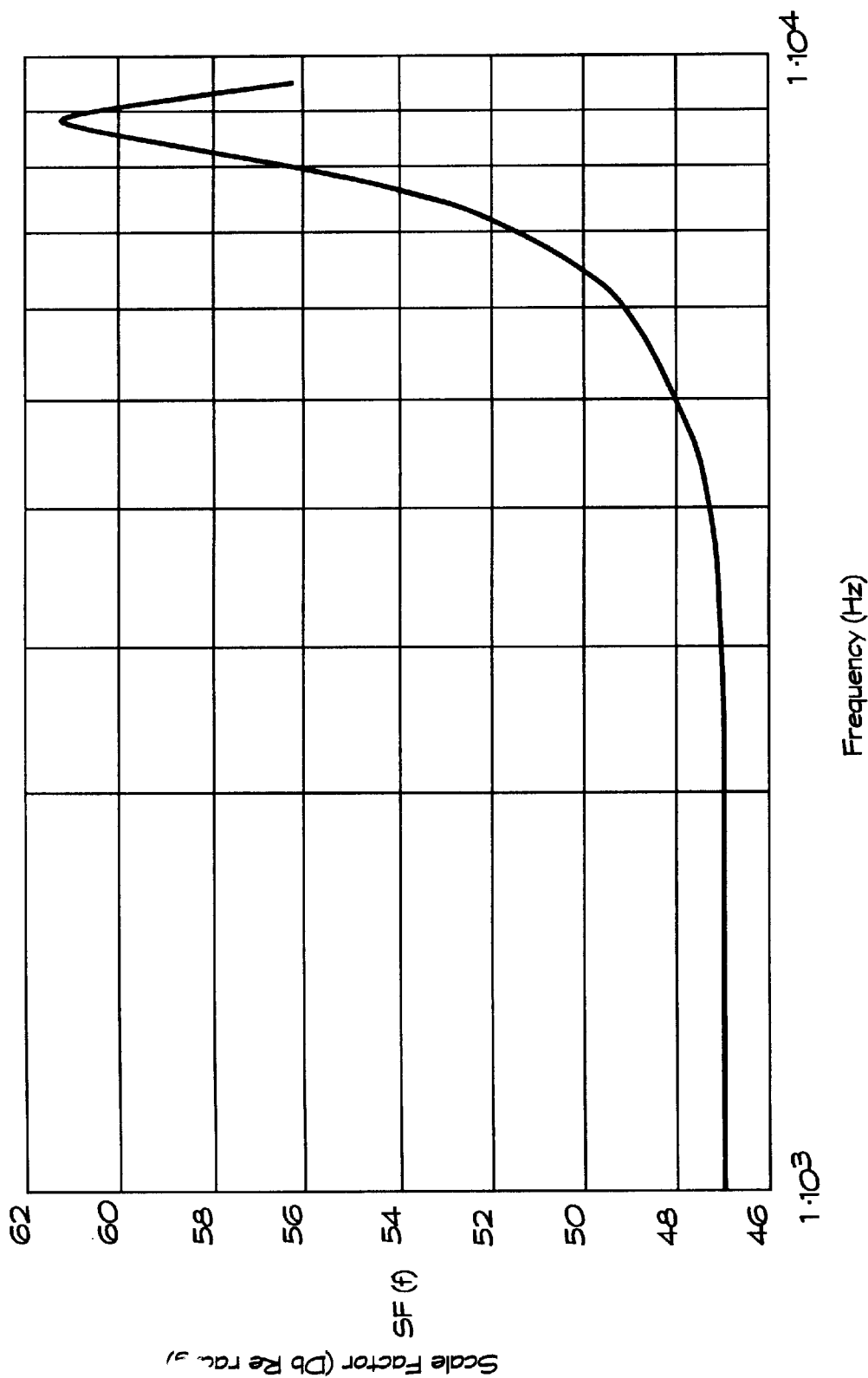
FIG. 4 graphically illustrates the scale factor in gain of the particle motion accelerometer of FIG. 1 as a function of frequency.
Figure 5:
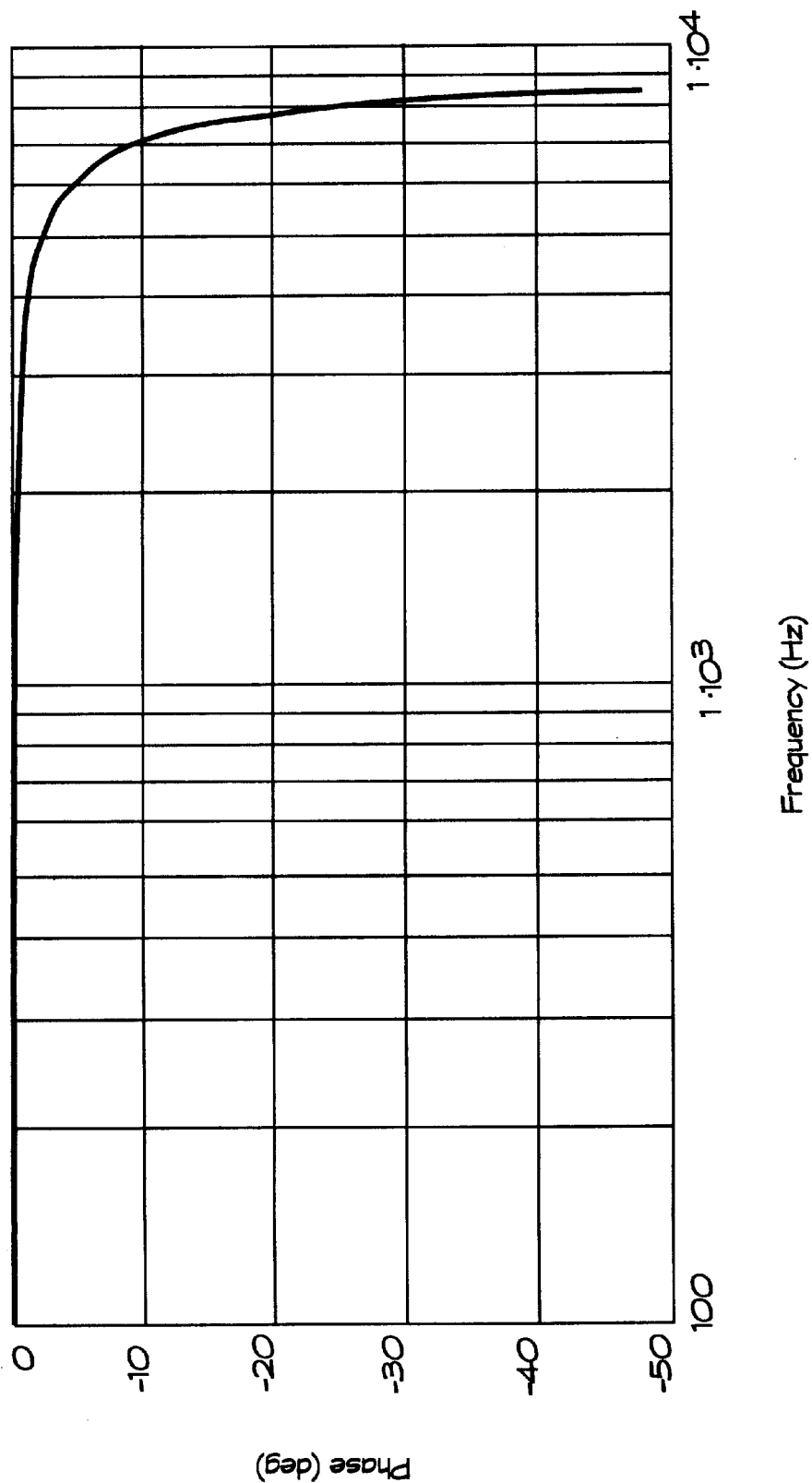
FIG. 5 graphically illustrates the scale factor in phase of the particle motion accelerometer of FIG. 1 as a function of frequency.

FIG. 4 graphically illustrates the scale factor in gain of the particle motion accelerometer of FIG. 1 as a function of frequency. FIG. 5 graphically illustrates the scale factor in phase of the particle motion accelerometer of FIG. 1 as a function of frequency. The sensor embodiment of FIG. 1 uses about one-third of the optical fiber used in prior art accelerometers for similar performance.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic particle motion accelerometer, comprising:
    a housing;
    a mid-section mounted within the housing such that the mid-section flexes in response to acceleration along a sensing axis;
    a proof mass mounted to an outer edge of the mid-section;
    a first spiral-wound optical fiber coil mounted to a first side of the mid-section;
    a second spiral-wound optical fiber coil mounted to a second side of the mid-section;
    a first hinge formed in the mid-section adjacent the mounting of the mid-section in the housing; and
    a second hinge formed in the mid-section between the proof mass and the first and second fiber optic coils.

2. The fiber optic particle motion accelerometer of claim 1, further comprising a pair of mounting posts connected to the housing with a central portion of the mid-section being secured between ends of the mounting posts.

3. The fiber optic particle motion accelerometer of claim 2 wherein the first hinge is formed in a portion of the mid-section between the mounting posts and the fiber optic coils.

4. The fiber optic particle motion accelerometer of claim 3 wherein the first hinge comprises a first reduced thickness portion of the mid-section and the second hinge comprises a second reduced thickness portion of the mid-section, with the first and second hinges having unequal thicknesses.

5. The fiber optic particle motion accelerometer of claim 4, further comprising:
    a first spacer mounted between the first side of the mid-section and the first fiber optic coil;

a second spacer mounted between the second side of the mid-section and the second fiber optic coil.

6. The fiber optic particle motion accelerometer of claim 1, wherein the housing is formed generally as a cylinder having an inner peripheral slot therein and the mid-section has an outer edge portion retained within the inner peripheral slot to mount the mid-section to the housing.

7. The fiber optic particle motion accelerometer of claim 6 wherein the mid-section is formed generally as a cylinder having a central passage therein and the proof mass is mounted to an inner edge portion of the mid-section.

8. The fiber optic particle motion accelerometer of claim 7 wherein the mid-section has a first reduced thickness portion adjacent the outer edge portion that defines the first hinge and a second reduced thickness portion adjacent the inner edge that defines the second hinge.

* * * * *